United States Patent [19]

Haupt et al.

[11] Patent Number: 5,017,928
[45] Date of Patent: May 21, 1991

[54] LOW SIDELOBE ARRAY BY AMPLITUDE EDGE TAPERING THE EDGE ELEMENTS

[75] Inventors: Randy L. Haupt, Monument; Christopher J. McCormack, Colorado Springs, both of Colo.

[73] Assignee: The United States of America as represented by the Secretary of the Air Force, Washington, D.C.

[21] Appl. No.: 570,670

[22] Filed: Aug. 22, 1990

[51] Int. Cl.[5] .............................................. G01S 3/06
[52] U.S. Cl. ..................................... 342/379; 342/372; 367/103
[58] Field of Search .............................. 342/371–373, 342/379, 382, 383; 367/103, 119, 138; 73/625

[56] References Cited

U.S. PATENT DOCUMENTS

| | | |
|---|---|---|
| 1,643,323 | 9/1927 | Stone . |
| 2,286,839 | 6/1942 | Schelkunoff . |
| 3,553,706 | 1/1971 | Charlton . |
| 3,780,372 | 12/1973 | Unz . |
| 4,179,683 | 12/1979 | Hildebrand et al. ............ 342/379 X |
| 4,489,324 | 12/1984 | Blume ............................ 342/379 X |
| 4,642,645 | 2/1987 | Haupt .................................. 342/379 |
| 4,780,860 | 10/1988 | Sasakura et al. ................ 367/103 X |

Primary Examiner—Thomas H. Tarcza
Assistant Examiner—Tod Swann
Attorney, Agent, or Firm—William G. Auton; Donald J. Singer

[57] ABSTRACT

A system for reducing sidelobes of phased array antenna systems is performed by tapering the current amplitide of edge elements in the array while maintaining a full uniform current to the center elements in the array. Tapering may be adjusted with variable impedance devices until optimum sidelobe reduction is achieved.

6 Claims, 5 Drawing Sheets

SOLID LINE TAPERED AND DASHED LINE UNIFORM

SOLID LINE TAPERED AND DASHED LINE UNIFORM

LOW SIDELOBE ARRAY BY AMPLITUDE EDGE TAPERING THE EDGE ELEMENTS

The invention described herein may be manufactured and used by or for the Government for governmental purposes without the payment of any royalty thereon.

BACKGROUND OF THE INVENTION

The present invention relates generally to radar systems and more specifically the invention pertains to a system which produces low sidelobe levels in array antennas. The center elements of the array have a uniform current amplitude weighting while the edge elements have a current amplitude taper. Tapering the current of the edge elements produces a low sidelobe far field pattern with a simplified feed network.

Microwave radar and communication antennas emit radio frequency (RF) signals in a beam which, when directed, has a main lobe and sidelobes. The main lobe is the useful portion of the emitted radiation which can track a target for a radar system or any useful information for a communication system.

Sidelobes are undesired radiation phenomena which use up the energy of an antenna, and which are capable of generating interference. Current methods for constructing low sidelobe antennas for radar systems include: amplitude tapering the array; phase tapering the array; nonuniform element spacing; and using a combination of the above techniques. Each of these approaches are discussed below.

Amplitude tapering the array is performed when the current fed to the array elements is tapered from a maximum at the center to a minimum at the edges. Common amplitude tapers include Dolph-Chebychev, Taylor, and binomial. These tapers may be found in most antenna books. These tapers require complicated feed networks that are difficult to build and test.

Phase tapering the array is performed when the phase of the current at each element in the array is tapered. This technique is not commonly used and requires a large array. Only a limited amount of sidelobe control is possible.

Nonuniform element spacing is performed when the elements in the array are either randomly spaced or unequally spaced in a manner that produces low sidelobe levels. These arrays are difficult to build and test. Low sidelobes are difficult to obtain and grating lobes are a problem. A combination of the above techniques is very complex and is seldom used.

The task of reducing sidelobes is alleviated, to some extent, by the systems disclosed in the following U.S. Pat. Nos., the disclosures of which are incorporated herein by reference:

U.S. Pat. No. 3,780,373 issued to Unz;
U.S. Pat. No. 3,553,706 issued to Charlton;
U.S. Pat. No. 2,286,839 issued to Schelkunoff; and
U.S. Pat. No. 1,643,323 issued to Stone The patents identified above relate to the use of amplitude control in antenna arrays to achieve certain performance characteristics. In particular, the Unz patent describes a nonuniformly optimally spaced antenna array where the optimum positions were systematically determined by a synthesis technique. Both the optimum position for each array antenna and the corresponding amplitude are determined by solving a linear equation involving complex Fourier series coefficients.

The Charlton patent relates to an antenna array where the radiating elements are arranged into group of elements. In each group, the elements are arranged to be symmetrical about three axes having a common intersection and commonly excited, and each group of elements different basic is excited by a different basic excitation signal.

The Schelknunoff patent describes a method and means for obtaining optimum prescribed directive action from a linear antenna array. Both the spacing of array elements and the amplitude distribution are determined by the complex coefficients of a polynominal expansion, which is presented in the patent.

The Stone patent relates to a method and means for a directive radio transmitting and receiving station. A directive antenna array is disclosed which radiates and receives only in a desired direction. To accomplish this uni-directional transmission or reception, the intensities of excitation along the rows and columns of the array are graded according to the coefficients of a polynomial expansion, which is presented in the patent.

While the above-cited references are instructive, a need remains to use amplitude tapering of phased array antennas to produce low sidelobe levels. The present invention is intended to satisfy that need.

SUMMARY OF THE INVENTION

The present invention includes a design for an antenna array in which the center elements of the array have a uniform current amplitude weighting while the edge elements have a current amplitude taper. Tapering the current of the edge elements produces a low sidelobe far field pattern with a simplified feed network.

As an antenna design process, the present invention begins by arranging a set of center subarrays in a symmetrical configuration. The elements in the subarrays can form either a planar array or a linear array.

The set of edge subarrays are fixed so that they circumscribe the set of center subarrays. As mentioned above, during operation, a full amplitude electrical signal is supplied to the set of center subarrays while a tapered amplitude electrical signal is supplied to the set of edge subarrays. To optimize performance and sidelobe reduction characteristics, electromagnetic measurements are made with sensors while providing variations to the tapered amplitude electrical signals supplied to the edge subarrays. These variations are made using variable impedance devices in the corporate feed network which are attached to the antenna.

Once an optimum taper is found for the electrical signals, the variable impedance devices can be replaced by fixed impedance devices which have electrical characteristics commensurate with the setting of the variable impedance devices at the optimum taper state.

It is a principal object of the present invention to provide an antenna design system which reduces sidelobe levels of phased array antennas.

It is another object of the present invention to reduce the sidelobe levels of phased array antennas by tapering the electrical current supplied to edge elements in the array.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a system for producing low sidelobes in phased array antennas by amplitude tapering electrical current which is provided to the radiating elements at the edges of the array.

Phased array antennas consist of a number of radiating elements fixed on either a linear of planar configuration on an array. The transmitted signals from these antennas can be electronically steered by controlling and shifting the phase of individual elements in the array. Examples of varying the relative phase shift of elements with respect to each other to steer the transmitted signals are provided in detail in such texts as the "Introduction to Radar Systems" by M. Skolnik, and the "Antenna Engineering Handbook" by H. Jasik, the disclosures of which are incorporated by reference.

Figure 1:
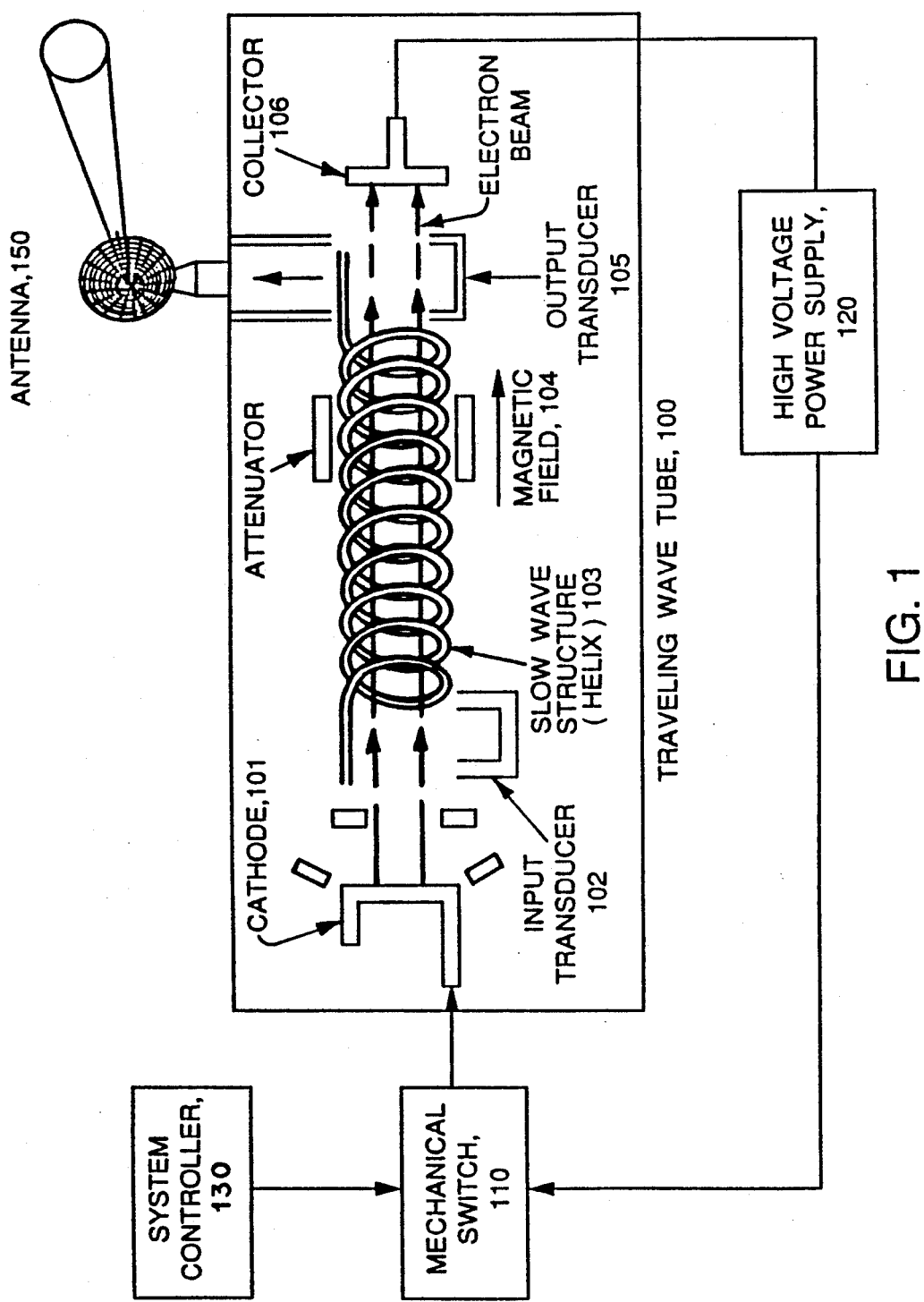
FIG. 1 is an illustration of a prior art antenna transmitter system.

The reader's attention is now directed towards FIG. 1, which is an illustration of a prior art radar transmitting system composed of: a system controller 130 a mechanical switch 110, a travelling wave tube 100, a high voltage power supply 120, and a radiating antenna 150.

For the system of FIG. 1 to operate as a tracking radar system, the system controller 130 must direct the mechanical switch 110 to activate the travelling wave tube 100 and power supply 120 to provide an output pulse to the antenna 150 to radiate a signal. Once the signal is transmitted, the switch 110 acts as a duplexer and turns off the transmitted signal so that radar echo return signals can be detected.

The shape and direction of the output beam of the antenna 150 are controlled by adjusting the phase of the current provided to the individual radiating elements. This is best understood by looking at FIG. 2.

Figure 2:
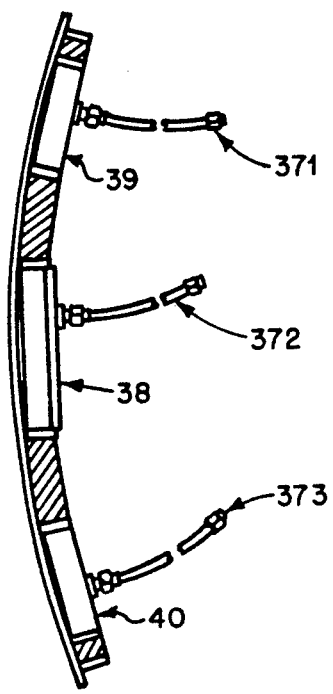
FIG. 2 is an illustration of a corporate feed network supplying electrical signals to a planar array which has a center subarray and two edge subarrays.

FIG. 2 is a view of an array of these radiating elements 38-40 which are supplied with current by a corporate feed of cables 371-373. The direction of the beam product by the array is steered electronically by adjusting the phase of the current provided to the elements 38-40 by the corporate feed cables 371-373. More specifically if the current provided by feed cable 371 is advanced with respect to that of cable 372; and if the current provided by cable 373 is retarded with respect to that of cable 372, the output beam will be steered towards element 40 rather than radiate normal to element 38.

While it is common to adjust the shape and direction of an output beam by adjusting the phase of the current provided to radiating elements, the present invention proposes something quite different. The present invention proposes to adjust the shape of an output beam by tapering the amplitude of the current provided to elements at the edge of the array, as discussed below.

The main beam produced by an antenna is composed of a main lobe, and sidelobes. The main lobe is the useful portion of the emitted signal which can track a target for a radar system, or can carry useful information for a communication system. Sidelobes are undesired radiation phenomena which may be reduced by the present invention as discussed below.

Figure 3:
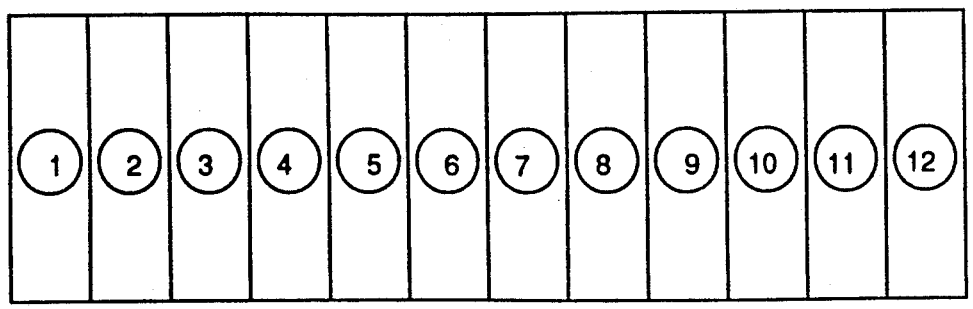
FIG. 3 is an illustration of an antenna design of the present invention.

The reader's attention is now directed towards FIG. 3, which is a diagram of an array with twelve subarrays 1-12. The center arrays 3-10 are uniformly weighted. This means that the electrical current supplied to them has a uniform amplitude. The edge arrays 1, 2, 11 and 12 are tapered. This means that the electrical current supplied to them has a reduced amplitude with respect to that provided to the center arrays. This produces low sidelobes in the far field pattern of the main beam as discussed below.

A partially tapered array has the center 2N elements uniformly weighted and the M edge elements on each end of the array tapered. The array factor for a partially tapered array with a symmetric amplitude taper is expressed by:

$$FF(x) = \frac{\sin(Nx)}{\sin(x/2)} + 2 \sum_{m=N+1}^{N+M} a_m \left( \cos \frac{2m-1}{2} x \right) \quad (1)$$

where $x = k\,d\cos\phi$ $k$ = wavenumber $d$ = element spacing $\phi$ = direction of incident field $a_m$ = element amplitude weight at positions $m$ and $-m$ The first term in (1) is the array factor of the uniformly weighted center elements, and the second term is the discrete Fourier transform of the nonuniformly weighted edge elements. Our goal is to find the $a_m$ such that the maximum sidelobe level is a minimum.

We begin by formulating the problem for unconstrained minimization and use Powell's method to find the $a_m$. Since the phase weighting is assumed to be zero, the amplitude weights are constrained to have values between zero and one. This constrained problem can be turned into an unconstrained problem by the following substitution:

$$a_m = \tfrac{1}{2} + \tfrac{1}{2} \cos \gamma_m \quad (2)$$

Performing an unconstrained optimization on $\gamma_m$ produces an optimized value for $a_m$ between zero and one.

Several cost functions are possible, such as minimum relative sidelobe level, minimum sidelobe level, minimum sidelobe energy, minimum beamwidth, taper efficiency, etc. We defined the cost function as the minimum relative sidelobe level of the largest sidelobe as a function $\gamma$. Thus, our algorithm searches for the set of weights that produces the lowest relative sidelobe level.

Figure 4:
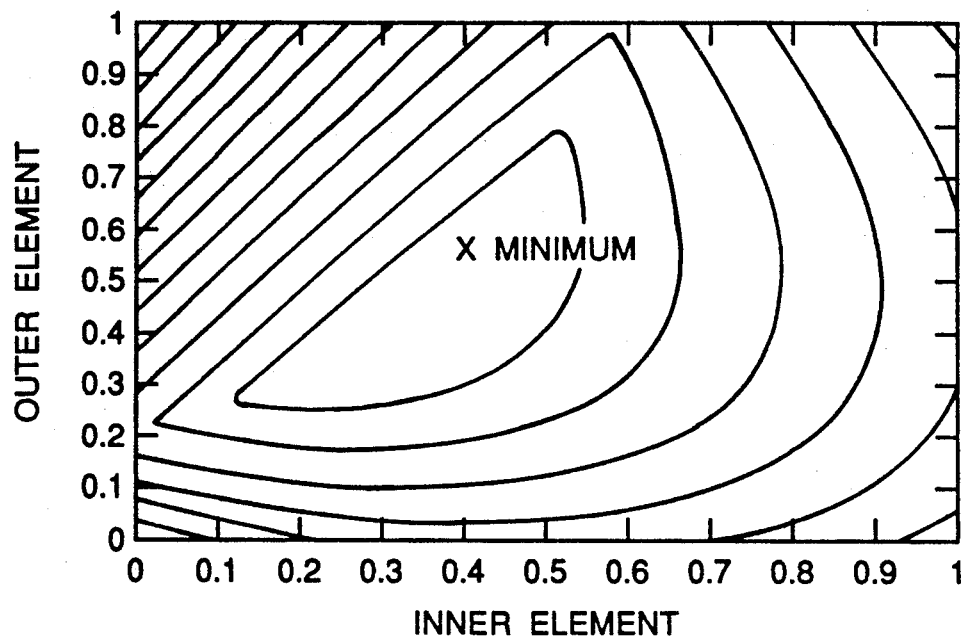
FIG. 4 is a chart of the maximum sidelobe level plotted as a function of edge element weights $a_5$ (abscissa) and $a_6$ (ordinate)
Figure 5:
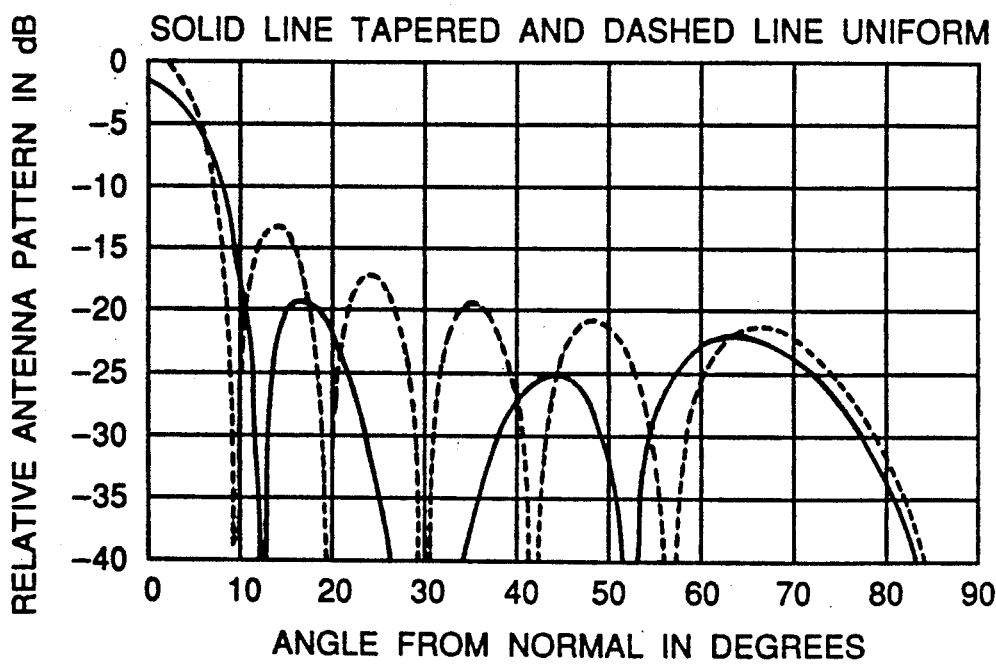
FIG. 5 is a chart of the far field pattern of a 12 element array with the center 8 elements uniformly weighed and the edge elements tapered ($a_5=239$ and $a_6=0.335$). These weights correspond to the minimum of the contour plot in FIG. 1 with a minimum relative sidelobe level cost function.

The cost function for an array with N=4 elements and M=2 elements is graphed as a contour plot in FIG. 4. Such a plot has a single minimum within the range $-\pi \leq m \leq \pi$ or $0 \leq a_m \leq 1$. This minimum value is easily reached from any point within the bounds. The minimum point on the graph is at $a_5=0.410$ and $a_6=0.580$. FIG. 5 is a graph of the optimum array factor for the above minimization. The highest sidelobe in this pattern is at 17.64 dB below the peak of the main beam. Unfortunately, the optimum amplitude taper goes from a minimum value to a maximum value at the edges. Such an inverse taper with a large jump in amplitude weight occurs for larger arrays with tapered edge elements too.

Figure 6:
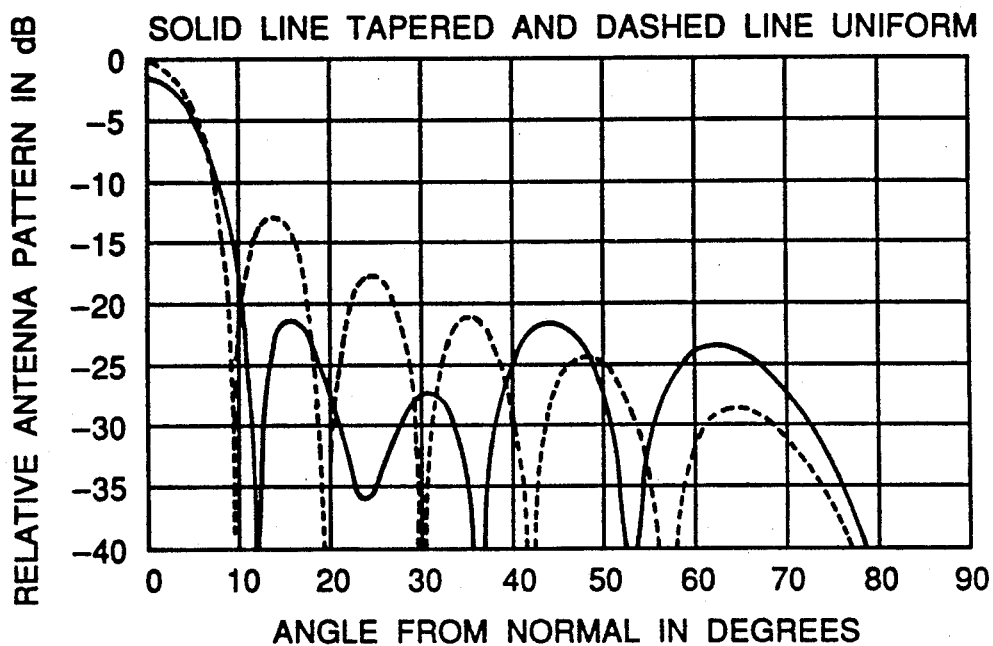
FIG. 6 is a chart of the far field pattern of a 12 element array with the center 8 elements uniformly weighed and the edge elements tapered ($a_5=234$ and $a_6=0.643$) These weights result from optimizing the array factor times a cosine squared element power pattern with a minimum relative sidelobe level cost function.

The pattern can also be optimized by including an element pattern. If the elements are assumed to have a cosine squared element pattern, then the weights are $a_5=0.234$ and $a_6=0.643$, and the far field pattern is shown in FIG. 6. In case, the discontinuity and inverse taper problems are even worse than the previous case. Multiplying the array and element factors together during the optimization results in maximum relative sidelobes that are 19.76 dB below the peak of the main beam, whereas performing the optimization on the array factor then multiplying by the element pattern produces sidelobes that are only 18 dB below the peak of the main beam.

The inverse taper may be excluded in the optimization technique by assuming:

$$a_{m+1} = (\tfrac{1}{2} + \tfrac{1}{2} \cos \gamma_{m+1}) a_m \quad (3)$$

Figure 7:
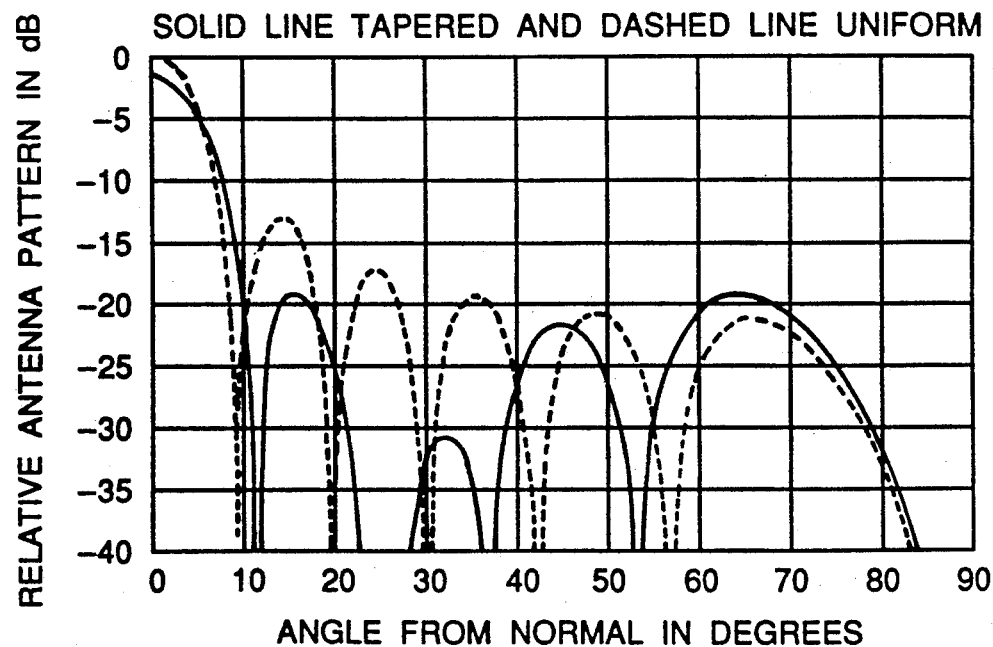
FIG. 7 is a chart of the far field pattern of a 12 element array with the center 8 elements uniformly weighted and the edge elements tapered ($a_5=0.234$ and $a_6=0.643$). These weights result from optimizing the array factor times a cosine squared element power pattern with a minimum relative sidelobe level cost function.

The factor in front of $a_m$ will always be less than or equal to one. Thus, the amplitude weight closest to the center of the array is always the largest, and the edge weight is always the smallest. This formulation results in amplitude weights $a_5=0.389$ and $a_6=0.389$. The far field pattern from this taper is shown in FIG. 7 and has a maximum sidelobe level of 17.17 dB below the peak of the main beam. Now, the optimization is constrained to the region below a diagonal line drawn from the lower left corner to the upper right corner of FIG. 4.

Tapering the edge elements produces a modest decrease in sidelobe level while keeping the majority of the array uniformly weighted. The examples shown here produce less than a 2 dB decrease in the main beam and between a −17 and a −20 dB maximum sidelobe level. Consequently, the relative sidelobe level is about 4 to 6 dB lower than for a uniform array with the same number of elements. It is possible to take the element pattern and shape of the taper into account during the optimization process.

The new feature of the invention is that the edge elements are amplitude weighted to lower the sidelobe level. The advantage of this practice is the ability to have greater control over the antenna pattern while keeping all the element spacings equal and only modifying a small part of the array. The elements are all uniformly spaced and only the edge elements are fed differently, thus reducing the feed network complexity. Most of the elements are uniformly weighted and only the edge elements are not, thus simplifying the manufacture and design of the array. This technique also maintains a high antenna gain. Amplitude tapering the entire array lowers the gain of the array.

Returning to FIG. 1, note that it is the function of the travelling wave tube 100 to produce an electrical current which represents the high powered pulse that is transmitted by the antenna 150. This electrical current is conducted by the output transducer 105 of FIG. 1, through the corporate feed cables 371-373 of FIG. 2 into the antenna array element 39-40. In the present invention, all of the elements in the set of elements in the center arrays will receive the electrical current at near its full amplitude. The sets of elements in the edge arrays will receive a tapered electrical current with a reduced amplitude.

There exists a variety of methods available that permit one to taper either the voltage or the current of electrical signals to the elements in the edge arrays. For example, coaxial impedance elements added to the coaxial cables 371 and 373 of FIG. 2 will reduce the voltage (not the current) to edge elements 39 and 40. Current drain elements added to the corporate feed cables 371 and 373 can reduce the current to elements 371 and 373. A suitable current sink device is described in U.S. Pat. No. 4,573,177 issued to K. Petrosky, which is incorporated by reference The Petrosky patent discloses a bi-directional current differencer which can reduce a current by a measured amount.

At this point, the user of the present invention may inquire "how much voltage or current reduction to the edge elements is suitable to reduce the sidelobes to an acceptable amount?". The answer depends upon the application of the antenna system, and should be determined empirically as described below.

The basic principles of antenna design are described in the above cited Skolnik and Jasik references. Generally the array characteristics will be selected from the output electric field required, and frequency of operation. The number of elements in the array must be sufficient to produce the total output electric field required, and the spacing of each of the elements is conventionally about $\lambda/2$ where $\lambda$ is the wavelength distance. The total number of elements and the separation spacing value ($\lambda/2$) together will determine the overall size of the array.

Typical radar frequency bands are listed below in Table 1. The radar wavelengths range between about one centimeter, and 10 meters.

TABLE 1

| Radar frequency band | Frequency |
| --- | --- |
| UHF | 300–1,000 Mc |
| L | 1,000–2,000 Mc |
| S | 2,000–4,000 Mc |
| C | 4,000–8,000 Mc |
| X | 8,000–12,500 Mc |
| K | 12.5–18 Gc |
| K | 18–26.5 Gc |
| K | 26.5–40 Gc |
| Millimeter | >40 Gc |

Once the array has been built it should be tested to determine the sidelobe levels. For such testing, electromagnetic readings are taken during the operation of the antenna to determine the antenna performance characteristics. During this testing the corporate feed cables of the edge elements can be provided with different values of impedances (for voltage reduction) or different values of current drain elements (for current reduction) while the sidelobe levels are retested. This process of retesting and readjustment can continue until optimum antenna performance is achieved.

Figure 8:
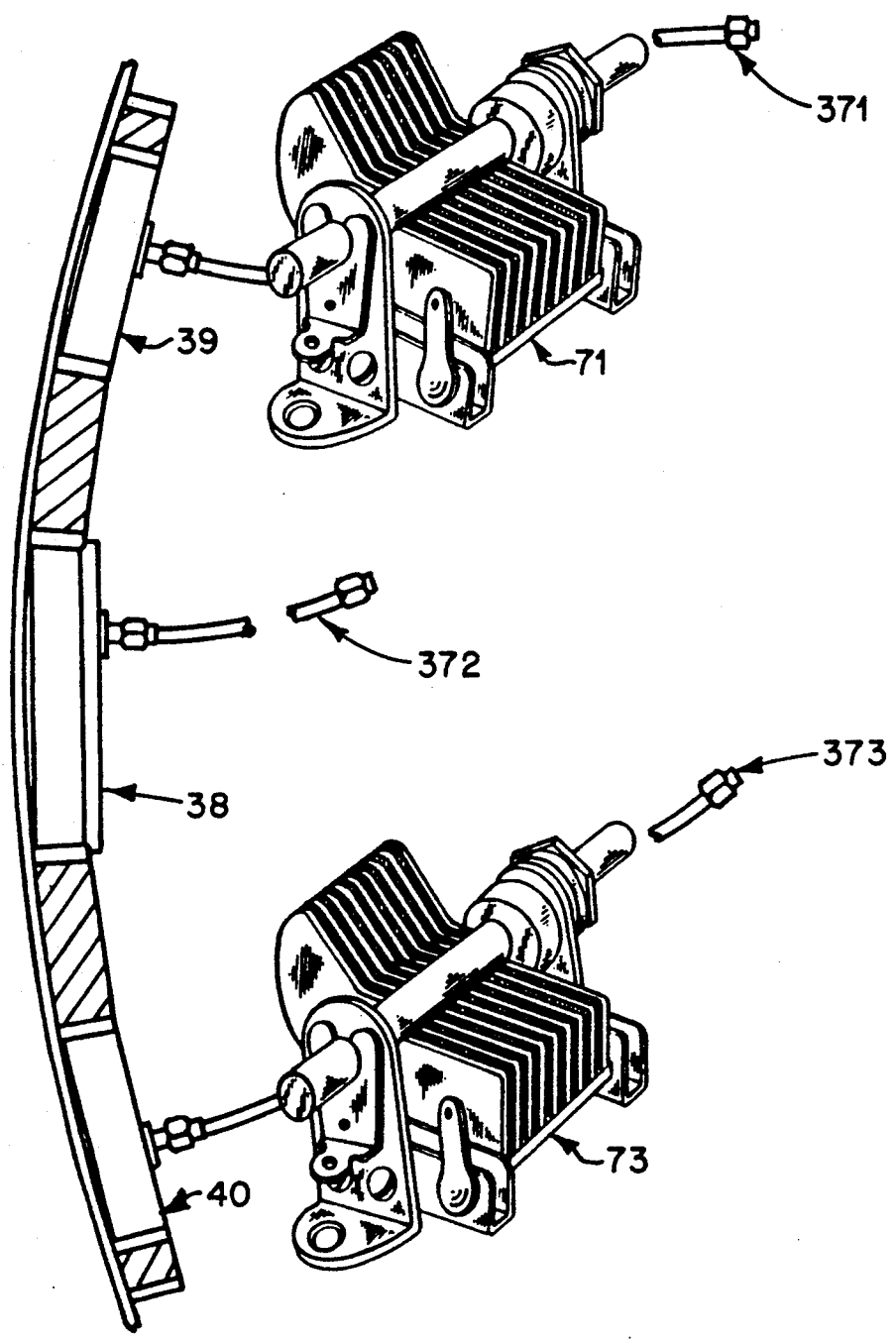
FIG. 8 is an illustration of the array of FIG. 2 with a means for reducing signals to the edge subarrays.

FIG. 8 is an illustration of a system which uses variable capacitors 71 and 73 attached to two of the corporate feed cables 371 and 373 to taper the current which is provided to the edge array elements 39 and 40. As described above in the discussion of FIG. 2. The corporate feed cables 371-373 connect the elements of all the arrays 38-40 to the travelling wave tube 100 of the radar transmitter In accordance with the teachings of the present amendment, the elements of the center array 38 receive the voltage and current of transmitted signals at uniform strength and full amplitude The current conducted to the elements of the edge arrays is tapered or reduced by the variable capacitors 71 and 73 as discussed below.

The current conducted by the variable capacitors is proportional to the capacitance of the device. This means that the current supplied to the edge array elements 39 and 40 can be variably tapered by decreasing the capacitance of the variable capacitors 71 and 73. The present invention teaches a tapering of the current and voltage supplied to edge elements is a sidelobe reduction system. For the purpose of the present invention, other variable impedance devices can be substituted for the variable capacitors of FIG. 8. These variable resistors, variable inductors, and potentiometers. All of these devices can taper either the current or the voltage received by the edge elements to attenuate sidelobes in the manner discussed above.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A phased array antenna system which is fixed to a transmitter which outputs a plurality of electrical transmitter signals, said phased array antenna system receiving and radiating said electrical transmitter signals into free space in a main beam which contains a main lobe and sidelobes, said phased array antenna system comprising:

a set of center subarrays which receive said electrical transmitter signals with a uniform current amplitude, said set of center subarrays thereby radiating said main beam wherein said set of center arrays comprise eight subarrays which are fixed in a row;

a set of edge subarrays which are fixed so that they encompass said set of center subarrays, said set of edge subarrays receiving said set of electrical transmitter signals with a tapered current amplitude, said set of edge subarrays thereby contributing to said main lobe while reducing said sidelobes of said main beam, and wherein said set of edge subarrays comprise a first and second edge subarray which are respectively fixed on each end of said row; and a means for supplying said set of center subarrays and said set of edge subarrays respectively with electrical voltage so that said set of enter subarrays receives said electrical voltage with uniform voltage amplitude, and said set of edge subarrays receives said electrical voltage with tapered voltage amplitude, wherein said supplying means comprises a plurality of variable impedance elements which are electrically connected between said corporate feed network and one of said edge subarrays to taper said electrical signals provided thereto, wherein each of said variable impedance elements comprises a potentiometer.

2. An antenna design process for designing a phased array antenna system for emitting a radio frequency signal which has an output electrical field E manifested in a beam with a main lobe and sidelobes, wherein said phased array antenna system emits said radio frequency signal at a frequency selected from a range of 300 Mc to 40 Gc, said antenna design process comprising the steps of:

arranging a set of center subarrays in a symmetrical configuration, wherein said arranging step includes selecting a sufficient number of uniformly spaced center subarray radiating elements to output a total output electrical field of about 90% of E, wherein said arranging step includes placing radiating elements of said set of center subarrays in said symmetrical configuration with a uniform spacing so that each of said radiating elements are separated from an adjacent radiating element by a distance no greater than one half a wavelength of said radio frequency signal;

fixing a set of edge subarrays in proximity with said set of center subarrays so that said set of edge subarrays circumscribe said set of center subarrays;

radiating said radio frequency signal using a full amplitude electrical signal for said set of center subarrays and using a tapered amplitude electrical signal for said set of edge subarrays; and measuring said main lobe and said sidelobes while conducting said radiating steps and while providing variation to said tapered amplitude electrical signal until said sidelobes are reduced to an acceptable level.

3. An antenna design process, as defined in claim 2, wherein said arranging step includes selecting a sufficient number of uniformly spaced center elements to output a total output electric field of about 90% of E.

4. An antenna design process, as defined in claim 3, wherein said arranging step includes placing radiating elements of said set of center subarrays in said symmetrical configuration with a uniform spacing so that each of said radiating elements are separated from an adjacent radiating element by a distance no greater than one half a wavelength of said radio frequency signal.

5. An antenna design process, as defined in claim 4, wherein said phased array antenna system emits said radio frequency signal at a frequency selected from a range of 300 Mc to 40 Gc.

6. An antenna design process, as defined in claim 5, wherein said measuring step includes adjusting a set of variable impedance devices to adjust electrical signals to said set of edge subarrays.

* * * * *